United States Patent [19]

Cilento

[11] 3,920,553

[45] Nov. 18, 1975

[54] POSITIONING DEVICE FOR FILTER CARTRIDGE ASSEMBLY

[75] Inventor: Guido D. Cilento, Southington, Conn.

[73] Assignee: AMF Incorporated, White Plains, N.Y.

[22] Filed: June 27, 1974

[21] Appl. No.: 483,737

[52] U.S. Cl.................................. 210/232; 210/444
[51] Int. Cl.²........................................ B01D 27/08
[58] Field of Search .......... 210/232, 440, 443, 444, 210/506

[56] References Cited
UNITED STATES PATENTS

| | | | |
|---|---|---|---|
| 1,780,663 | 11/1930 | Winslow et al. ................ | 210/440 X |
| 1,901,484 | 3/1933 | Winslow et al. ................ | 210/440 X |
| 2,980,257 | 4/1961 | Paton ............................. | 210/444 X |
| 3,224,590 | 12/1965 | Nord et al. ...................... | 210/440 X |
| 3,225,929 | 12/1965 | Sicard ............................. | 210/444 |
| 3,246,920 | 4/1966 | Pall ................................ | 210/232 X |
| 3,282,429 | 11/1966 | Wood et al. .................... | 210/232 X |
| 3,319,790 | 5/1967 | Lindberg ......................... | 210/232 |
| 3,503,511 | 3/1970 | Spitzberg ....................... | 210/232 |

*Primary Examiner*—Theodore A. Granger
*Attorney, Agent, or Firm*—George W. Price; Martin Smolowitz

[57] ABSTRACT

A positioning device for use with a filter cartridge assembly in which an elongated centering member is provided with an integrally fitting end abutment having cartridge engagement prongs associated therewith. Once the cartridge is disposed on such elongated centering member, an additional retaining member is fixedly attached to the other end of the elongated member to thereby positively position the cartridge. Both ends of the device are provided with positioning contour for seating in a pre-disposed manner within the assembly.

1 Claim, 2 Drawing Figures

POSITIONING DEVICE FOR FILTER CARTRIDGE ASSEMBLY

The present invention is directed to a device employed in a filter cartridge assembly. More particularly, the present invention is directed to an elongated body member employed in conjunction with a filter cartridge and vessel therefore. Such device serves to receive and correctly position the cartridge within the sump.

From time to time as filter media i.e. cartridge, becomes spent, it is necessary to halt the filtration operation and replace the filter assembly with a fresh cartridge. Furthermore, the position of the cartridge within the sump for correct fluid flow is quite important, since any eccentricity or other deviation will tend to create unfavorable or unworkable conditions. It follows that a simple, reliable, easy to use and maintain device for positioning and retaining the cartridge within the sump is most desirable.

By way of background, filter cartridge assemblies of the type to which the inventive device is used require a compressive load on each end so as to block-off by-pass flow. In order to accomplish this, the filter head and the bottom of the sump are usually provided with circular edges. When installing and tightening the sump to the head, such edges close up on the filter element disposed therebetween. Furthermore, simultaneous adverse reaction forces are developed at the cartridge seals and at the sump closure gasket. Also, because of dimensional variations in the manufacture of components, it becomes quite difficult to establish a precise torque that is necessary to insure effective sealing at both the cartridge ends and the sump closure.

Attempts to overcome this problem have considered employing a telescopic seal between the sump of the head without defining a particular stop point for eliminating the counter-acting reaction forces, as mentioned above, or under energizing one of the two seals when excessive load resistance is present at the other seal.

Accordingly, the principal features of the present invention are directed to a cartridge positioning apparatus for use with a filter assembly employing a filter vessel body; a head adapted to fit into said vessel body and a filter cartridge positioned within said vessel body wherein said positioning apparatus includes: one piece centrally disposable first member having an integral stop means at one end thereof; attached stop means disposed on said first member opposite to said integral stop means; said integral stop means being adapted to seat into a recess formed in said head thereby defining the spatial relationship between said cartridge and said filter assembly and recess means formed of said integral stop means for receiving a seal means adapted to cooperate with the wall surfaces defining said recess.

Also within the scope of the invention is a center guide post for correctly positioning a filter cartridge within a filter vessel body to assure positive, liquid tight sealing and thereby urging water to be treated through a filter cartridge disposed about said guide, including: an elongated member having a plurality of integrally formed gripping surfaces for engaging said filter cartridge at a first end; lower guide means adapted to be attached to said elongated member at one end and integrally formed upper guide means adapted to be attached to said elongated member at a second end.

Accordingly, it is the main object of the present invention to overcome any defects of the prior art.

It is still another object of the present invention to provide for a convenient and fool proof device for receiving and positioning a filter cartridge within the sump.

It is still another object of the present invention to provide a device for receiving a filter cartridge which permits easy assembly, sealing and centering of the filter element independent of sealing of the sump and the associated head.

It is still another object of the present invention to provide a device for correctly positioning the cartridge within the sump and serving as a locator at the bottom end whereby cap pressure is evently applied at all points.

It is still a further object of the present invention to provide a center post guide assembly for use with a filter cartridge whereby a positive, liquid tight seal is formed forcing all of the fluid passing therethrough to be acted upon by the filter cartridge.

Still other objects and advantages of the present invention will be more fully understood with reference to the accompanying specification, claims and appended drawings.

IN THE DRAWINGS

Figure 1:
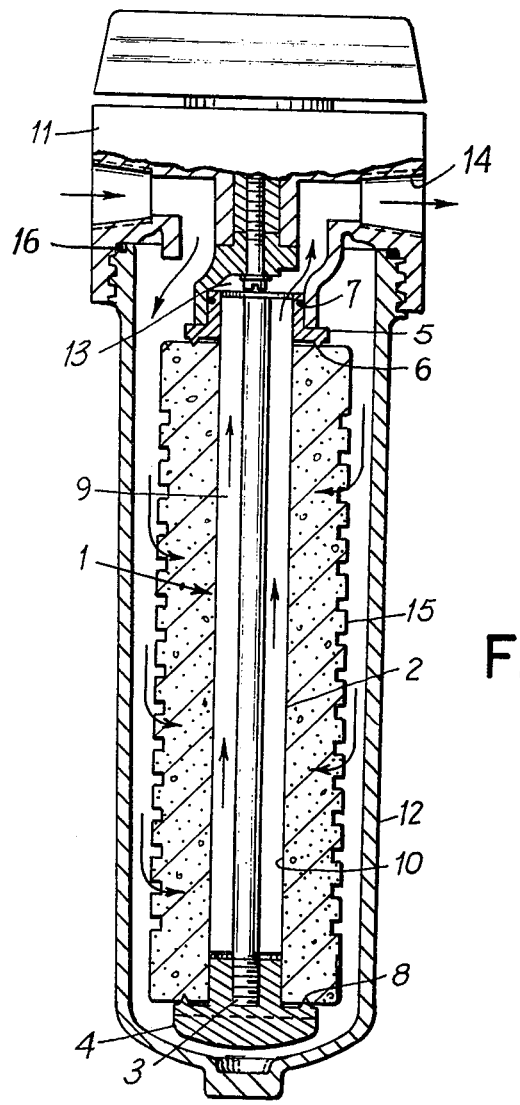
FIG. 1 is a partial cross-sectional view of the inventive device as employed with a filter cartridge.
Figure 2:
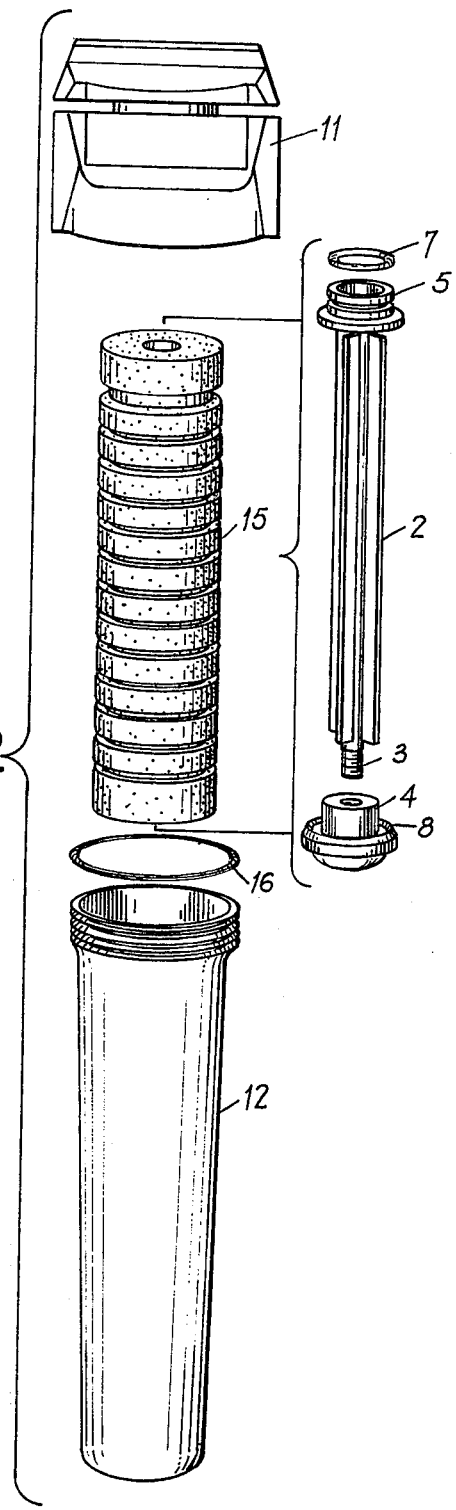
FIG. 2 is an exploded view in perspective of FIG. 1.

In accordance with the present invention as shown in FIG. 1, the inventive device 1 includes an elongated center post 2 having a threaded member 3 at one end for receiving a cap member 4 thereon. The other end of the center post 2 is provided with an integrally formed abutment 5 having one surface with teeth 6 for positively engaging the filter cartridge 15 once it has been inserted and advanced along the center post 2. The abutment 5 is provided with a recess for receiving an O ring sealing member 7. In addition, cap 4 is similarly provided with teeth 8 for positively engaging and gripping the filter cartridge 15. The center post 2 is provided with a plurality of fluted sections 9 which allows the cartridge 15 to be inserted thereon. Once inserted into the head 11, the sections 9 define fluid flow passages 10 for the passage of outboard flowing fluid.

During a filter cartridge replacement operation, the cap portion 4 is threadably removed from member 3 of the center post 2 by a twisting action and the cartridge 15 is physically withdrawn from the center post 2. For installation of a new cartridge, one advances the cartridge 15 along the center post 2 until it engages the abutment 5 at which time the cap 4 is threadably inserted on the member 3 to snuggly position the cartridge 15 along the center post 2. Thereafter, the center post assembly with cartridge 15 thereon, is positioned into the filter head 11 and the sump 12 in turn is fastened and tightened to the head 11. The internal structure of the head 11 is provided with a centrally disposed recess 13 such that the abutment 5 of the center post is positionable therein to allow the cartridge 15 and center post 2 assembly to positively fit and be centered within the sump 12 in a fool-proof manner. Furthermore, the recess 13 serves to permit treated fluid to pass therethrough and exit through the output port 14.

The overall cartridge assembly also employs a gasket 16 which in turn serves to define a definite stop point between the sump 12 and the head 11. Furthermore, with the present invention, the head 11 no longer applies a rotational force on the end of the cartridge 15 with the result that damage and chafing to the end of the filter cartridge 15 is minimized. Also the use of such center post assembly in conjunction with a filter cartridge, results in a uniform flow annulus around the filter cartridge 15. Lastly, with the present invention, the manufacturing tolerances, especially with respect to filter cartridge length, are no longer to be as critical as in the past.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What I claim is:

1. An apparatus for positioning a filter cartridge in a vessel, including:

an elongated member longitudinally positionable within a recessed member depending from said vessel, said elongated member having a plurality of integrally formed locating surfaces disposed about its periphery for receiving and centering a filter cartridge thereon;

a first sealing member affixed to said elongated member at the upper end thereof, provided with a flange portion extending therefrom, having a sealing projection for sealing with a first end of said cartridge, fluid flow passage means internal of said first sealing member for communication with said recessed member and elastomeric sealing means disposed at the upper end of said first sealing member for sealing at the contact surfaces with said recessed member;

a second sealing member fixedly de-attachable to the lower end of said elongated member, provided with a flange portion extending therefrom, having a sealing projection for sealing with a second end of said cartridge, said respective sealing projections being adapted to seal the respective interfaces formed at the ends of said cartridge with said sealing members, as said second sealing member is affixed to said elongated member; and abuttment means depending from said second sealing member for grasping said second sealing member.

* * * * *